US010382555B2

(12) United States Patent
Wahler

(10) Patent No.: US 10,382,555 B2
(45) Date of Patent: Aug. 13, 2019

(54) VEHICLE DATA DISTRIBUTION SYSTEM AND METHOD

(71) Applicant: GOGO LLC, Chicago, IL (US)

(72) Inventor: Ronald A. Wahler, Boulder, CO (US)

(73) Assignee: GOGO LLC, Chicago, IL (US)

( * ) Notice: Subject to any disclaimer, the term of this patent is extended or adjusted under 35 U.S.C. 154(b) by 143 days.

(21) Appl. No.: 13/675,200

(22) Filed: Nov. 13, 2012

(65) Prior Publication Data

US 2014/0136658 A1 May 15, 2014

(51) Int. Cl.
*H04L 29/08* (2006.01)
*H04W 76/15* (2018.01)
(Continued)

(52) U.S. Cl.
CPC ......... *H04L 67/12* (2013.01); *H04B 7/18506* (2013.01); *H04B 7/18508* (2013.01); *H04W 48/18* (2013.01); *H04W 76/15* (2018.02)

(58) Field of Classification Search
CPC ........... H04L 29/06027; H04L 67/1097; H04L 67/00; H04L 67/327; H04L 12/1859; H04L 12/2801; H04L 12/2807; H04L 65/4092; H04L 9/12; H04W 84/12; H04W 28/20; H04W 28/18; H04W 4/00; H04W 4/06; H04W 4/02; H04W 8/24; H04W 40/20; H04W 48/18; H04W 74/004; H04M 7/006; H04M 11/00; H04M 15/56; H04M 1/7253; H04M 1/738; H04B 7/18513;
(Continued)

(56) References Cited

U.S. PATENT DOCUMENTS 5,652,795 A 7/1997 Dillon et al.
5,699,384 A 12/1997 Dillon
(Continued)

FOREIGN PATENT DOCUMENTS

WO WO-2008/138376 A1 11/2008

OTHER PUBLICATIONS

International Preliminary Report on Patentability, International Application No. PCT/US2013/069529, dated Feb. 13, 2015.
(Continued)

*Primary Examiner* — Younes Naji
*Assistant Examiner* — Da T Ton
(74) *Attorney, Agent, or Firm* — Marshall, Gerstein & Borun LLP; Randall G. Rueth

(57) ABSTRACT

Techniques for delivering data or information onto a vehicle and for delivering data off of a vehicle include a data distribution system having multiple interfaces that are fixedly connected to the vehicle, and that provide access to multiple types of data bearers connected to external networks. A bearer selector engine may select a particular data bearer for delivery of data based on a set of selection criteria, which may be indicated in a set of selection rules on-board the vehicle. The selection criteria may be based on bearer characteristics, data characteristics, vehicle operating state and/or other current conditions, priority, a feature or service, and/or user preference. Using one or more on-board networks, data may be generated by an on-board originating device and routed for external delivery, or external data may be delivered to an on-board destination device. Data delivery may occur while the vehicle is en route.

35 Claims, 5 Drawing Sheets

(51) Int. Cl.
*H04B 7/185* (2006.01)
*H04W 48/18* (2009.01)

(58) Field of Classification Search
CPC ............ H04B 7/18515; H04B 7/18523; H04H 2201/13; H04H 2201/37; G06F 3/048; G06F 3/165; G06F 13/00; G07C 5/008
USPC ......... 709/217–219, 227–229, 249; 370/316, 370/338, 352; 725/68, 76
See application file for complete search history.

(56) References Cited

U.S. PATENT DOCUMENTS

| | | | |
|---|---|---|---|
| 5,995,725 A | 11/1999 | Dillon | |
| 5,995,726 A | 11/1999 | Dillon | |
| 6,016,388 A | 1/2000 | Dillon | |
| 6,047,165 A | 4/2000 | Wright et al. | |
| 6,104,926 A | 8/2000 | Hogg et al. | |
| 6,125,184 A | 9/2000 | Dillon et al. | |
| 6,131,160 A | 10/2000 | Dillon et al. | |
| 6,161,141 A | 12/2000 | Dillon | |
| 6,430,412 B1 | 8/2002 | Hogg et al. | |
| 6,741,841 B1 * | 5/2004 | Mitchell | H04B 7/18508 348/E7.093 |
| 6,799,037 B1 | 9/2004 | Mielke et al. | |
| 6,909,898 B2 | 6/2005 | Mielke et al. | |
| 7,426,387 B2 | 9/2008 | Wright et al. | |
| 7,426,388 B1 | 9/2008 | Wright et al. | |
| 7,428,412 B2 | 9/2008 | Wright et al. | |
| 7,559,691 B2 | 7/2009 | Fuhrmann | |
| 7,599,691 B1 | 10/2009 | Mitchell | |
| 7,689,752 B1 | 3/2010 | Redford et al. | |
| RE42,536 E | 7/2011 | Leuca et al. | |
| 1,025,783 A1 | 10/2011 | Hebb | |
| 8,032,135 B1 | 10/2011 | Redford et al. | |
| 8,094,605 B2 | 1/2012 | Lynch et al. | |
| 8,140,732 B2 | 3/2012 | Redford et al. | |
| 8,457,034 B2 | 6/2013 | Kuehl et al. | |
| 8,606,266 B1 * | 12/2013 | Mitchell | H04L 69/321 455/427 |
| 2002/0095498 A1 * | 7/2002 | Chanda et al. | 709/225 |
| 2003/0055975 A1 | 3/2003 | Nelson et al. | |
| 2003/0171094 A1 | 9/2003 | Kawai | |
| 2004/0054918 A1 | 3/2004 | Duri et al. | |
| 2004/0186760 A1 | 9/2004 | Metzger | |
| 2004/0267410 A1 | 12/2004 | Duri et al. | |
| 2005/0090283 A1 * | 4/2005 | Rodriquez | 455/552.1 |
| 2005/0286452 A1 * | 12/2005 | Hardgrave | H04W 84/005 370/310 |
| 2008/0140571 A1 | 6/2008 | Inbarajan et al. | |
| 2009/0041041 A1 * | 2/2009 | True | H04B 7/18506 370/401 |
| 2009/0100476 A1 * | 4/2009 | Frisco | H04B 7/18508 725/68 |
| 2010/0127193 A1 * | 5/2010 | Abernathy et al. | 250/551 |
| 2011/0095905 A1 | 4/2011 | Mase | |
| 2012/0039262 A1 * | 2/2012 | Walsh | H04L 45/04 370/329 |
| 2012/0214506 A1 | 8/2012 | Skaaksrud et al. | |
| 2012/0268319 A1 | 10/2012 | Mitchell | |
| 2012/0303826 A1 * | 11/2012 | Nelson | H04B 7/18506 709/228 |

OTHER PUBLICATIONS

Digital Video Broadcasting (DVB); DVB-S2 Adaptive Coding and Modulation for Broadband Hybrid Satellite Dialup Applications,: ETSI TS 102 441 V1.1.1, Oct. 2005, 23 pages.
"Digital Video Broadcasting (DVB); Interaction channel through Public Switched Telecommunications Network (PSTN) / Integrated Services Digital Networks (ISDN)," European Telecommunication Standard, ETS 300 801: Aug. 1997, 14 pages.
"Digital Video Broadcasting (DVB); Interaction channel through the Global System for Mobile Communications (GSM)," European Broadcasting Union, EN 301 195 V1.1.1, Feb. 1999, 14 pages.
International Search Report and Written Opinion for Application No. PCT/US2013/069529 dated Mar. 31, 2014.
Extended European Search Report issued in European Application No. 17174236.4, dated Sep. 27, 2017.
European patent application No. 13801918.7, Communication pursuant to Article 94(3) EPC, dated Sep. 28, 2016.
European patent application No. 13801918.7, Communication pursuant to Article 94(3) EPC, dated Dec. 20, 2017.
European Patent Application No. 17174236.4, Communication pursuant to Article 94(3) EPC, dated Sep. 25, 2018.

* cited by examiner

VEHICLE DATA DISTRIBUTION SYSTEM AND METHOD

FIELD AND BACKGROUND OF THE DISCLOSURE

Technical Field

The instant disclosure generally relates to distributing data to and from a vehicle. More particularly, the instant disclosure generally relates to transmitting, from the vehicle, data generated by an on-board device and receiving, onto the vehicle, data destined for an on-board device.

Background

A known system for delivering data or information onto and off of a vehicle generally operates independently of other known data delivery systems. Typically, a known system uses a pre-defined and essentially fixed bearer to transfer data onto and off of a vehicle. Furthermore, the time period or travel state of the vehicle during which data is allowed to be transferred onto and off of the vehicle typically is also essentially fixed based on the application or use of the data. For example, data corresponding to known in-flight entertainment (e.g., movies, news clips, etc.) typically is manually loaded onto a storage drive on-board the aircraft while the aircraft is docked at a terminal. Similarly, information collected during flight into a "black box" or crash survival memory unit typically is retrieved via manually initiated instruction only after an aircraft has landed. In another example, an aircraft employs either a satellite communications network or an air-to-ground (ATG) communications network for delivering data corresponding to passenger telephone and data transfer during flight, but not both. Other data systems which may be on-board a vehicle (such as navigation systems, systems for receiving real-time traffic or weather data, systems to send and receive communications and alerts between the vehicle and stationary ground personnel, various devices on-board the vehicle requiring software updates, systems for collecting vehicle operating data, and the like) may also deliver and receive data independently of other data systems on-board the vehicle, and further may be limited to transferring data only a particular time period and/or only when vehicle is in a particular travel or operating state.

BRIEF SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An embodiment of a method for distributing data or information onto a vehicle may include selecting, based on a selection criterion, a particular bearer from a plurality of bearers. The plurality of bearers may be of different types and may be coupled to interfaces for receiving information onto the vehicle. The interfaces to the plurality of bearers may be fixedly coupled to the vehicle. The method also may include causing information to be received onto the vehicle using the selected bearer, and routing the information to a destination device that is on-board the vehicle. In some embodiments, a subsequent bearer may be determined, and at least a portion of the information may be received onto the vehicle using the subsequent bearer.

An embodiment of a method for distributing data or information that is generated on-board a vehicle may include selecting, based on a selection criterion, a particular bearer from a plurality of bearers. The plurality of bearers may be of different types and may be coupled to interfaces for transmitting information from the vehicle. The interfaces to the plurality of bearers may be fixedly coupled to the vehicle. The method may further include receiving information generated by an originating device that is on-board the vehicle, such as at a data distribution device, and causing the information to be transmitted from the vehicle using the selected bearer. In some embodiments, a subsequent bearer may be determined, and at least a portion of the information or data may be transmitted from the vehicle using the subsequent bearer.

An embodiment of a data distribution system on a vehicle includes a memory and computer-executable instructions stored on the memory and executable by a processor. The computer-executable instructions may be executable to select a particular bearer from a plurality of bearers. The computer-executable instructions may be further executable to cause first data to be received onto the vehicle via an interface that is fixedly coupled to the vehicle and that allows access to the particular bearer. The data received onto the vehicle may be routed to a destination device on-board the vehicle. Additionally or alternatively, the computer-executable instructions may be executable to cause second data to be transmitted from the vehicle via the interface corresponding to the particular bearer, or via another interface corresponding to another selected particular bearer. The second data may be generated by an origination device on-board the vehicle. Each interface of the plurality of interfaces may be included in a vehicle portal device fixedly connected to the vehicle.

In an embodiment, an information distribution system for distributing data to and from a vehicle may include an on-board information distribution device having a plurality of connections to a plurality of interfaces corresponding to a plurality of bearers. The plurality of bearers may be configured to allow data to be transmitted from the vehicle and/or to allow data to be received onto the vehicle, and the plurality of bearers may be of different types. The plurality of interfaces may be fixedly coupled to the vehicle. The information distribution system may also include a bearer selector engine to select a particular bearer from the plurality of bearers for data transfer.

DETAILED DESCRIPTION OF THE PREFERRED EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Any or all of the contents of the present disclosure may operate in conjunction with any or all of the contents of the disclosure of co-pending U.S. patent application Ser. No. 15/675,194 entitled "PUBLISHER AND SUBSCRIBER MESSAGING SYSTEM AND METHOD" and filed concurrently herewith, the contents of which are hereby incorporated by reference in their entirety. Additionally or alternatively, any or all of the contents of the present disclosure may operate in conjunction with any or all of the contents of the disclosure of co-pending U.S. patent application Ser. No. 13/675,190 entitled "GROUND SYSTEM FOR VEHICLE DATA DISTRIBUTION" and filed concurrently herewith, the contents of which are hereby incorporated by reference in their entirety.

Figure 1:
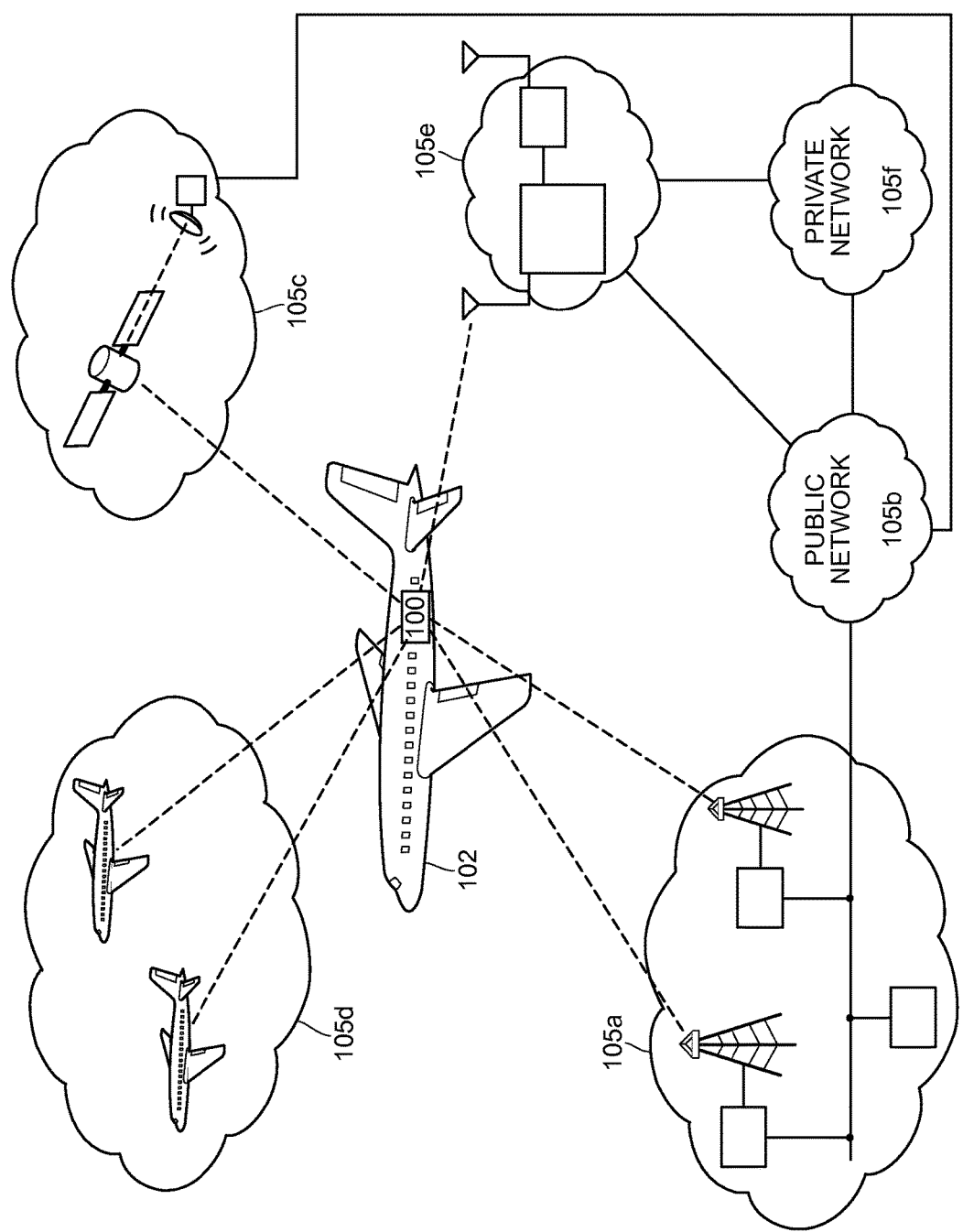
FIG. 1 includes a block diagram of an example ground based information or data distribution system for distributing information or data to a vehicle.

FIG. 1 illustrates an example information distribution system 100 (also referred to interchangeably herein as a "data distribution system") that is included on-board a vehicle 102. The information or data distribution system 100 is configured to distribute data or information onto a vehicle 102, from the vehicle 102, or both onto and from a vehicle 102. At any given moment in time, the information distribution system 100 may be in communicative connection with one or more networks 105a-105f that are disposed, managed, and/or hosted, for the most part (if not entirely), externally to the vehicle. As such, the networks 105a-105f are referred to herein as "external networks," and may be data networks, communication networks, or a combination of data and communication networks. For example, the external network 105b may be a public, ground-based data or communications network, such as the Internet and/or the PSTN (Public Switched Telephone Network). The external network 105f may be a ground-based private data and/or communications network. Generally, as referred to herein, a "ground" network or a "ground" computing device refers to networks and computing devices that are not being transported by the vehicle 102. Typically, ground systems and ground computing devices may be essentially fixed in location, and may be contained in one or more buildings or other structures that are fixedly attached to the ground or to earth.

In other examples, the external network 105d may be an air-borne network (e.g., an air-to-air (ATA) ad-hoc communication network). The external network 105e may also be primarily an air-borne network (e.g., a Wi-Fi based public or private network) that is located or hosted at a destination or origination point of the vehicle 102, or at a respective port, terminal, station or way station, dock, bay, garage, vehicle maintenance location, or other location at which the vehicle 12 may be fixedly stationed for a temporary amount of time. Such locations, for clarity, are referred to herein as a "port." Generally, a port may be a designated location from which vehicles may depart and at which vehicles may arrive. Examples of ports may include airports, shipping ports, railroad stations, hospitals, shipping terminals, bus terminals, fueling stations, vehicle maintenance or service areas, military bases, ports or aircraft carriers, and the like.

Further, the external network 105a may be a combination of ground based and air-borne networks, such as an air-to-ground (ATG) communication network for aircraft use, or a mobile communication network for cellular or mobile phones and smart devices. Typically, the information distribution system 100 may be communicatively connected to the external networks 105a-105f using at least a wireless connection or communication link, but for some external networks at certain instances in time, the information distribution system 100 may include a wired connection.

Each of the external networks 105a-105f may be a privately managed network, a public network, or some combination of one or more private and public networks. An external network 105a-105f may utilize any known communication protocol or combinations thereof, such as a standards-based wireless protocol, a standards-based wired protocol, a private wired protocol, or a private wireless protocol. For example, an external network may utilize the messaging protocol described in aforementioned U.S. patent application Ser. No. 13/675,194, entitled "PUBLISHER AND SUBSCRIBER MESSAGING SYSTEM AND METHOD." Some or all of the external networks 105a-105f may be connected to other external networks 105a-105f. For example, a private network 105e at an airport may be communicatively connected to nationwide private, ground-based data distribution network 105f for avionics information, which may in turn be connected to the Internet 105b.

Additionally, although FIG. 1 illustrates six external networks 105a-105f, the techniques and principles described herein equally apply to information distribution systems 100 that are in communicative connection to other numbers of external networks, such as one external network, two external networks, more than six external networks, or any other suitable number of external networks.

The vehicle 102 may be owned and/or operated by an individual, or the vehicle may be owned and/or operated by a company, organization or governmental entity. The vehicle may be one of a fleet of vehicles. The vehicle 102 may be used to transport passengers who pay for or otherwise are granted passage on the vehicle. The vehicle 102 may be used to transport executives or staff of a company or organization and their guests. The vehicle 102 may be used to transport live or inanimate cargo, packages, mail, and/or other types of passengers or cargo. Furthermore, although FIG. 1 depicts the vehicle 102 as an aircraft, the techniques and principles described herein equally apply to other types of vehicles such as trucks, automobiles, busses, trains, boats, ships, barges, subway cars, helicopters, ambulances or other emergency vehicles, military vehicles, other air-borne, water-borne, or land-borne vehicles, and vehicles that are suitable for space travel.

Figure 2:
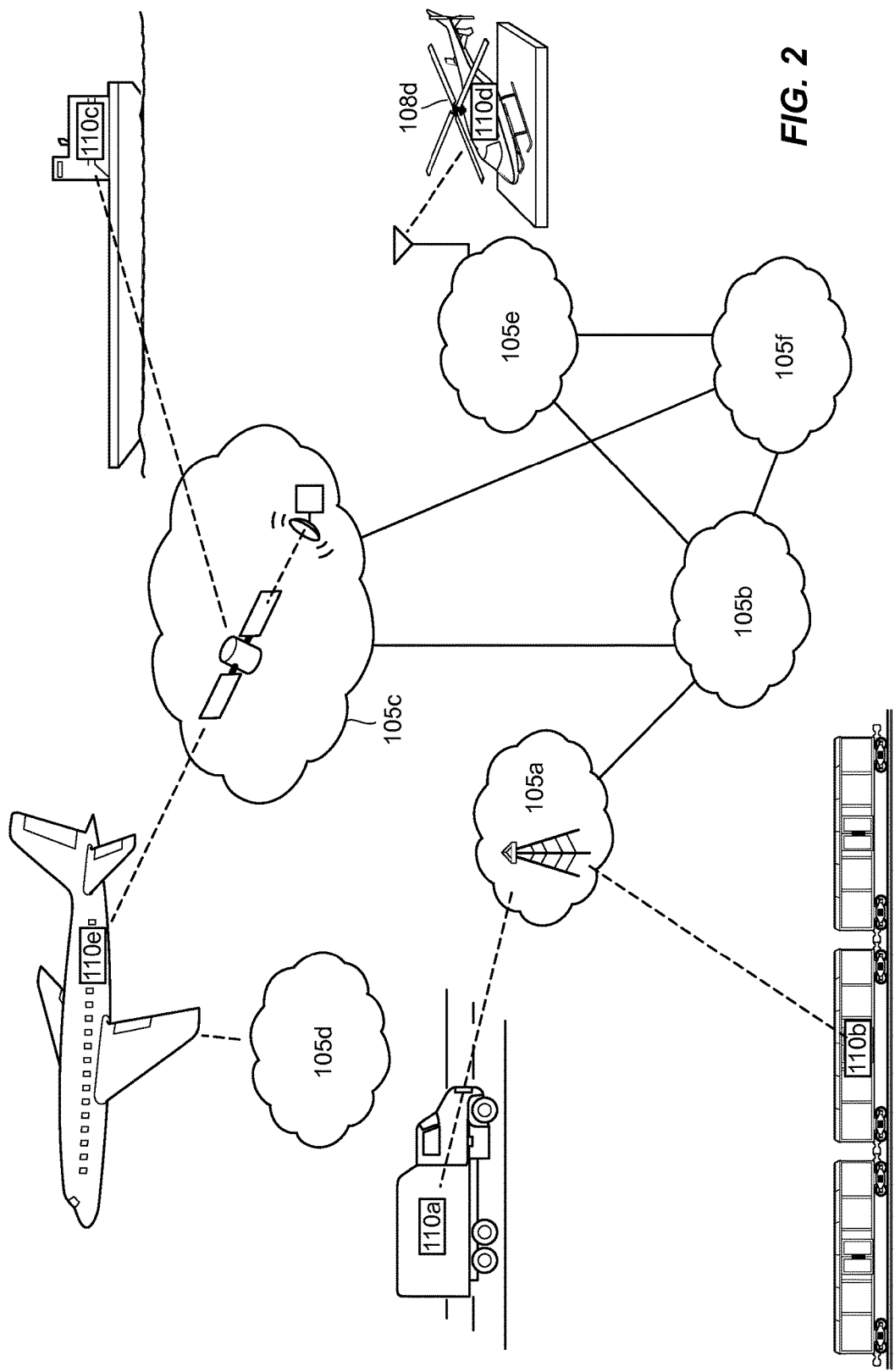
FIG. 2 illustrates examples of various vehicles that may communicate with the ground based information or data distribution system of FIG. 1.

FIG. 2 illustrates examples of various types of vehicles 108a-108e, each of which may include a respective instance 110a-110e of the information distribution system 100 of FIG. 1. Each instance of the information distribution system 110a-110e may be in communicative connection with at least one of the one or more external networks 105a-105f, as denoted by the dashed lines. At any given time, a particular instance of the information distribution system on a particular vehicle may be in communicative connection with a different set or subset of the external networks 105a-105f than is another instance of the information distribution system on another vehicle. For example, the information distribution system 110c on a ship 108c may be in communicative connection with the satellite network 105c, while the information distribution system 110b on a train 108b may be in communicative connection with the mobile communication network 105a, the Internet 105b and another land-based private network 105f.

Figure 3:
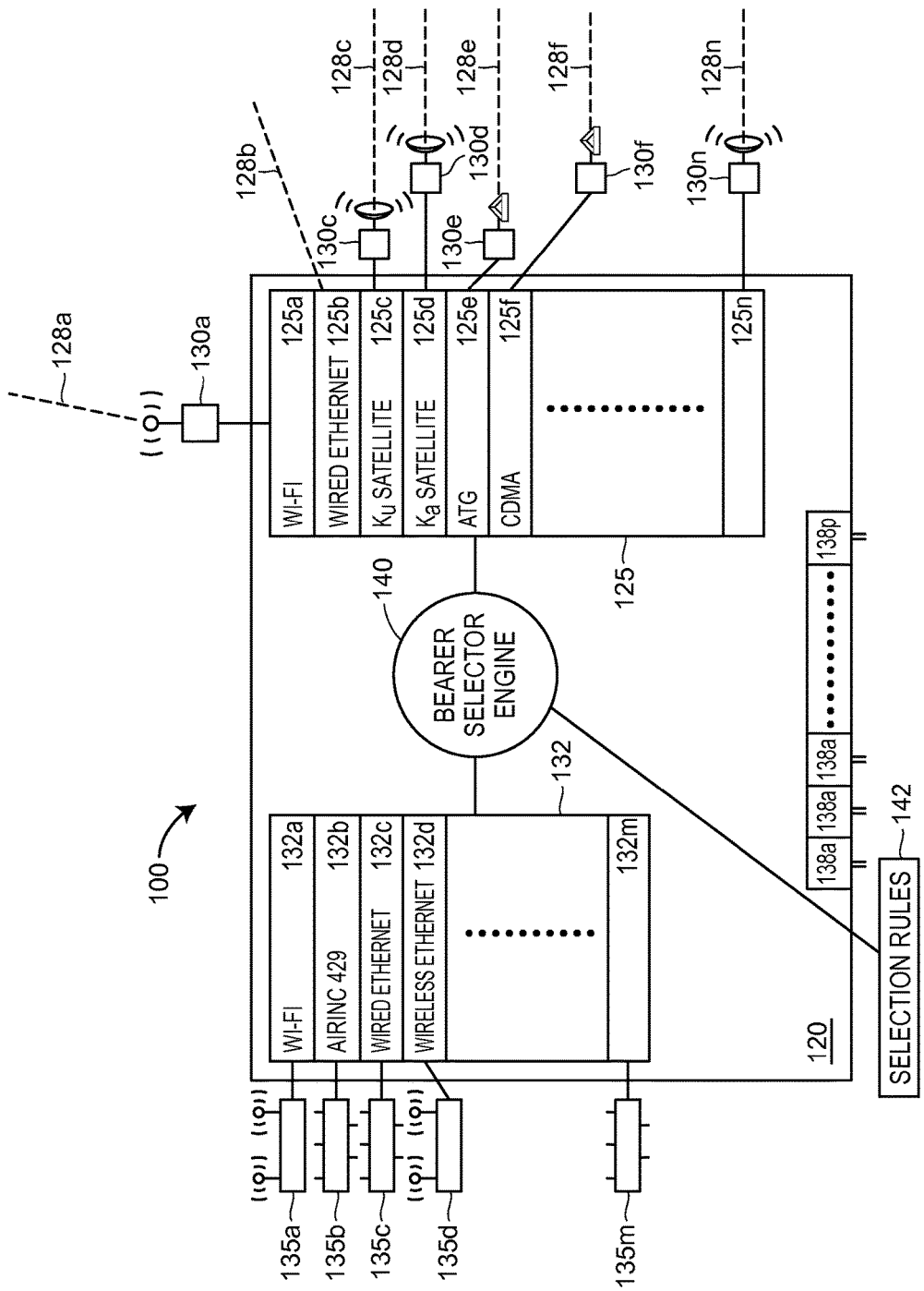
FIG. 3 is a block diagram of an embodiment of the information or data distribution system of FIG. 1.

FIG. 3 illustrates a block diagram of an embodiment of the information or data distribution system 100 of FIG. 1. In an embodiment, the information or data distribution system 100 may include an on-board information distribution device 120, also referred to interchangeably herein as an "on-board data distribution device."

The on-board information distribution device 120 may include a plurality of interfaces 125a-125n corresponding to a plurality of bearers 128a-128n. The interfaces 125a-125n are referred to herein as "external interfaces," as they enable data to be delivered onto and off of the vehicle 102. The external interfaces 125a-125n may be fixedly coupled to the vehicle 102, in an embodiment. For example, the external interfaces 125a-125n may be included in one or more Line-Replaceable Units (LRUs), and the one or more LRUs may be fixedly attached to the vehicle 102. In some embodiments, the on-board information distribution device itself 120 may be a single LRU or multiple LRUs. An on-board information distribution device 120 may include any number of multiple external interfaces 125a-125n, such as two, three, five or more external interfaces that correspond to multiple types of bearers 125a-125n.

In an embodiment, each external interface 125a-125n may correspond to a respective bearer 128a-128n. Additionally, each external interface 125a-125n may be configured to allow data to be transmitted from the vehicle 102 over the respective bearer 128a-128n, and/or to allow data to be received onto the vehicle 102 from the respective bearer 128a-128n. A "bearer" or "data bearer," as used interchangeably herein, generally refers to one or more communication channels that are designated to support a particular communication standard for transmitting and/or receiving information or data. A bearer may use wireless or wired technology, and the plurality of bearers 128a-128n may be of different types. One example of a bearer type is wireless local area network (WLAN) or Wi-Fi™ communications in the 2.4 and/or 5 GHz frequency bands using a protocol corresponding to an IEEE (Institute of Electrical and Electronics Engineers) 802.11 standard, as denoted by reference 128a. Other examples of bearer types include satellite communication or data bearers, such as satellites that use the $K_u$ or $K_a$ band (denoted by references 128c and 128d, respectively); satellites that are owned and operated by companies or organizations (e.g., Iridium Communications Inc., Inmarsat, SBB (SwiftBroadBand), and/or others), high-speed Internet satellites, and other satellite communications or data transport technologies. Still other examples of bearer types include wired Ethernet (denoted by reference 128b), wireless Ethernet, and mobile communication systems that use terrestrial modems, e.g., TDMA (Time Division Multiple Access), GSM (Global System for Mobile Communications), CDMA (Code Division Multiple Access, denoted by reference 128f), LTE (Long Term Evolution), and/or other mobile communications technologies. Other types of bearers may include air-to-ground (ATG) communication systems (reference 128e).

Each external interface 125a-125n may be communicatively connected to a respective transmission medium corresponding to the bearer 128a-128n, and each external interface 125a-125n may be configured to receive data onto the vehicle 102 over the respective transmission medium and to cause data to be transmitted from the vehicle 102 over the respective transmission medium. For example, a Wi-Fi external interface 125a may be connected to one or more Wi-Fi compatible transceivers and antennas 130a to send and receive data over a 2.4 and/or 5 GHz frequency band. In another example, an air-to-ground external interface 125e may be connected to one or more EVDO (Evolution Data Optimized) compatible transceivers and antennas 130e to send and receive data over channels reserved for air-to-ground communications, e.g., 849-851 MHz and 894-896 MHz. In yet another example, a first satellite external interface 125c may be connected to one or more suitable transceivers and antennas 130c to send and receive data over the $K_u$ band (e.g., 12-18 GHz), and a second satellite external interface 125d may be connected to one or more suitable transceivers and antennas 130d to send and receive data over the $K_a$ band (e.g., 26.5-40 GHz).

The on-board information distribution device 120 may be communicatively connected via a plurality of interfaces 132a-132m to one or more networks 135a-135m that are disposed, managed, and/or hosted entirely on-board the vehicle 102. Such networks 135a-135m are referred to herein as "on-board networks." An on-board network may be a wired network, a wireless network or a network that uses a combination of wired and wireless technology. An on-board network may be a public or a private network, and an on-board network may be a data or a communication network. One example of an on-board network may be a Wi-Fi network 135a that operates within the cabin of the vehicle. Another example of an on-board network may be an ARINC (Aeronautical Radio, Incorporated) 429 network 135b for routing and delivering avionics data. Other examples of on-board networks may include a wired Ethernet network 135c (e.g., which may be used for delivering maps and other cockpit data), a wireless Ethernet network 135d, and other networks. An on-board network may utilize any known communication protocol or combinations thereof, such as a wireless protocol, a wired protocol, other ARINC standard-compatible protocols, or a private protocol. For example, an on-board network may utilize the messaging protocol described in aforementioned U.S. patent application Ser. No. 13/675,194, entitled "PUBLISHER AND SUBSCRIBER MESSAGING SYSTEM AND METHOD." In some embodiments, a particular on-board network may be communicatively connected to the on-board information distribution device 120 via another on-board network. For example, access to Wi-Fi wireless access points of an on-board Wi-Fi network 135a may be provided by a wired Ethernet 135c that is in direct physical connection with the on-board information distribution device 120 via the wired Ethernet interface 132c. Furthermore, any suitable number of on-board networks 135a-135m may be included on the vehicle 102, e.g., one on-board network, two on-board networks, or more than two on-board networks.

Each on-board network 135a-135m may correspond to a respective on-board interface 132a-132m. Accordingly, the interfaces 132a-132m are referred to herein as "on-board network interfaces." Each on-board network interface 132a-132m may be configured to allow data or information that is generated by an originating on-board device in connection with a respective on-board network 135a-135m to be transmitted from the vehicle 102 over one of the bearers 128a-128n. Alternatively or additionally, each on-board interface 132a-132m may be configured to deliver, to a particular on-board destination device in connection with a respective on-board network 135a-135m, externally-generated data or information that is received over one of the bearers 128a-128n.

An "on-board device," as used herein, is a device that is contained within or on the vehicle 102 so that the on-board device is transported as the vehicle 102 travels. An example of an on-board device may be a device used by a passenger of the vehicle, such as a laptop, an electronic reader, a phone, a smart device, or other portable communication device. Another example of an on-board device may be a device disposed within or on the vehicle 102 that is used by crew members of the vehicle 102, such as devices used to aid in navigation of the vehicle; safety devices; LRUs; devices used to communicate with other vehicles or with control towers or stations; devices used to communicate with various interior portions of the vehicle (e.g., cockpit, cabin, decks, engine room, etc.); devices used to control environmental and climate conditions within the vehicle, devices used to control operations of at least portions of the vehicle; devices which store end-user entertainment media or other end-user accessible data; devices which store manuals and instructions; devices which record data corresponding to the operations and/or to the state of the vehicle or of equipment or cargo on-board the vehicle (such as while the vehicle is en route); and other such devices.

Returning to the on-board information distribution device 120, the on-board information distribution device 120 may additionally or alternatively include one or more direct interfaces 138a-138p that are configured to provide direct, non-network connections from the on-board information distribution device 120 to various other on-board devices. For example, a first direct interface 138a may provide a four-wire connection to equipment that is disposed in a particular area of the vehicle 102 (e.g., cockpit, engine room, etc.), a second direct interface 138b may provide an RS232 connection to an RS232-compatible device, and/or a third direct interface 138c may provide a USB (Universal Serial Bus) connection to a USB-compatible device. Other direct interfaces 138d-138p may provide, for example: a connection to on-board discrete controls of the vehicle 102, a connection to an audio control panel, a connection to on-board user environment equipment such as air conditioning, heating, lights, shades, etc.; an E1 communication connection; a T1 communication connection; an HDMI (High Definition Multimedia Interface) connection; a short-range wireless connection (e.g., Bluetooth® or the like); a POTS (Plain Old Telephone Service) connection; an FXS (Foreign eXchange Subscriber) connection; an FXO (Foreign eXchange Office) connection; a stereo connection; or any other desired direct connection over which data or information may be transferred. The on-board information distribution device 120 may include any number of desired direct interfaces 138a-138p, such as one direct interface, two direct interfaces, or more than two direct interfaces.

Thus, as described above, the on-board information distribution device 120 may be configured to receive, using the external interfaces 125a-125n, information onto the vehicle 102 from one or more external networks 105a-105f, and may be configured to cause the received information to be delivered to the appropriate destination device on-board the vehicle 102. The on-board information distribution device 120 may be configured to cause the received information to be delivered to the appropriate destination device by using the one or more on-board networks 135a-135m, or by using one of the direct interfaces 138a-138p. Additionally or alternatively, the on-board information distribution device 120 may be configured to transmit, from the vehicle 102 to one or more external networks 105a-105f, information generated by an origination device that is on-board the vehicle 102. The information to be transmitted may be received by the on-board information distribution device 120 via one of the on-board networks 135a-135m or via one of the direct interfaces 138a-138p. As such, the on-board information distribution device 120 may serve as a vehicle portal for the delivery of data or information onto and/or off of the vehicle 102. Accordingly, the on-board information distribution device 120 is interchangeably referred to herein as a "vehicle portal device."

Furthermore, as the on-board information distribution device 120 may cause data that is generated by an originating device on-board the vehicle 102 to be transmitted or delivered from the vehicle 102 using a selected bearer, and/or may cause data to be received, using a selected bearer, onto the vehicle 102 and to be distributed to a desired on-board destination device, the on-board information distribution device 120 may serve as a switch between the on-board devices, the on-board networks 135a-135m, and/or the external networks 105a-105f and bearers 128a-128n corresponding thereto. Accordingly, the on-board information distribution device 120 may also be interchangeably referred to herein as a "switch" or an "intelligent switch."

Referring still to FIG. 3, the on-board information distribution device 120 may include a bearer selector engine 140, also referred to interchangeably herein as a "bearer selection engine." In an embodiment, the bearer selector engine 140 may comprise a set of computer-executable instructions that are stored on a tangible, non-transitory computer-readable storage medium such as a memory, one or more memory devices, one or more data storage devices, and the like. The computer-executable instructions may be executable by a processor, and the processor may be included in the on-board information distribution device 120, in an embodiment. The tangible computer-readable storage medium on which the bearer selector engine 140 is stored may or may not be included in the on-board information distribution device 120, however, the tangible computer-readable storage medium may be accessible to a processor included in the on-board information distribution device 120. In an embodiment, the bearer selector engine 140 is included in a computing device, and the computing device is included in the on-board information distribution device 120.

The bearer selector engine 140 may be configured to select a particular bearer from the plurality of bearers 128a-128n, in an embodiment. In particular, the bearer selector engine 140 may select a suitable bearer in connection with a particular external network, and the on-board distribution device 120 may route, using the selected bearer, information or data between the particular external network and a device that is on-board the vehicle 102.

In an embodiment, the bearer selector engine 140 may select a particular bearer at least in part based on bearer availability. In particular, the bearer selector engine 140 may automatically detect the availability of at least some of the bearers 128a-128n. For example, the on-board information distribution device 120 may periodically send test packets over bearers, and/or the on-board information distribution device may receive signals corresponding to various bearers' availability. In another example, the on-board information distribution device 120 may detect an available bearer by receiving AMP protocol messages from a device corresponding to the bearer, as described in aforementioned U.S. patent application Ser. No. 13/675,194, entitled "PUBLISHER AND SUBSCRIBER MESSAGING SYSTEM AND METHOD." In an embodiment, the on-board information distribution device 120 may configure a bearer upon detecting its initial availability. The bearer selector engine 140 may then select a bearer based on the availability of the bearers as determined by the on-board information distribution device 120.

Figure 4:
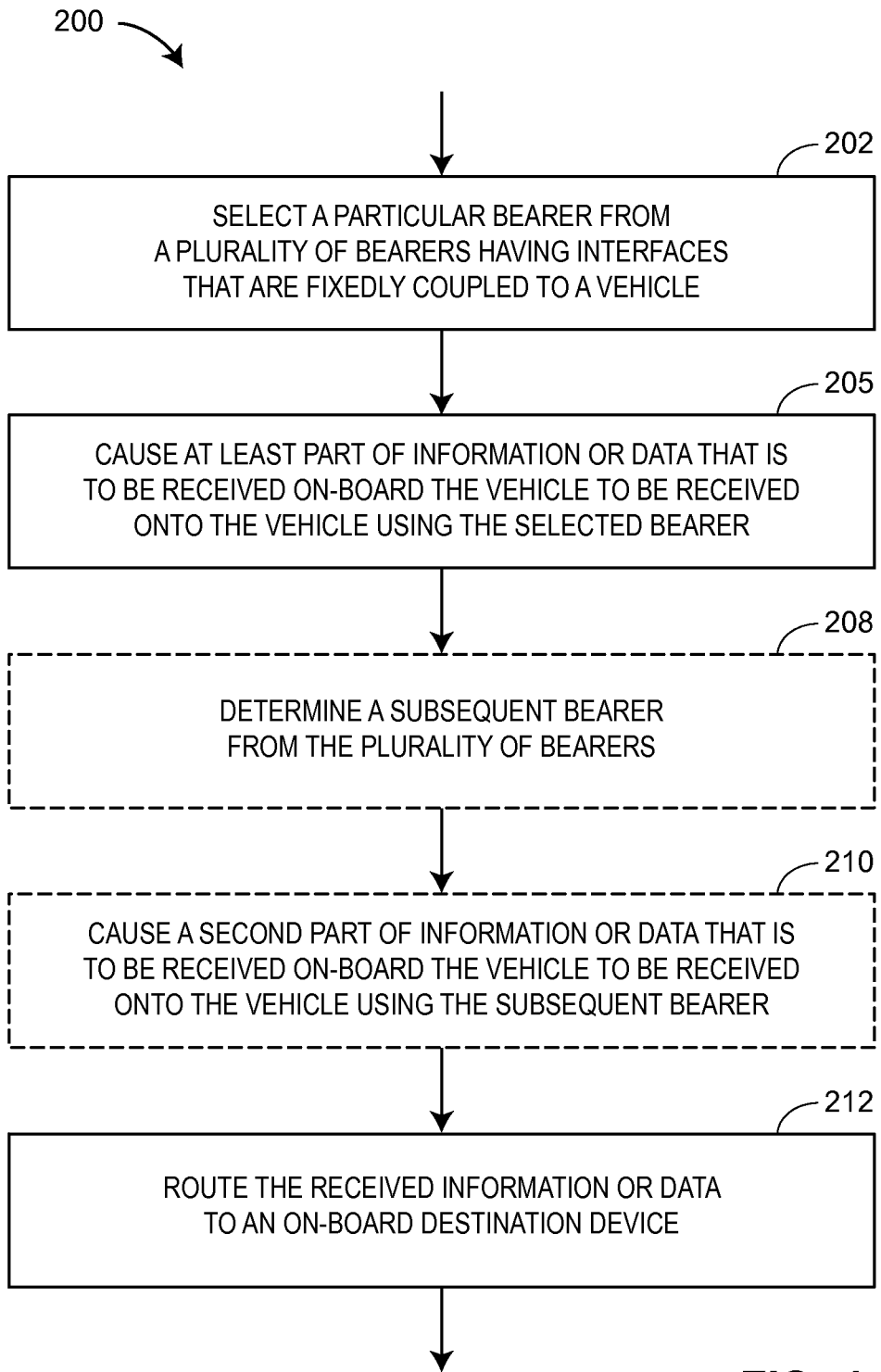
FIG. 4 is an example method for distributing externally generated data to devices that are on-board a vehicle.

In an embodiment, the on-board information distribution device 120 may perform a method 200 of distributing data to a vehicle, an embodiment of which is illustrated in FIG. 4. The method 200 may operate in conjunction with the data distribution system 100 of FIG. 1 and the on-board information distribution device 120 of FIG. 3, in an embodiment, or the method 200 may operate in conjunction with other systems and devices. In an embodiment, at least a portion of the method 200 may be performed by the bearer selector engine 140. For clarity, the method 200 is discussed below with reference to FIGS. 1, 2 and 3.

At a block 202, a particular bearer from a plurality of bearers 128a-128n may be selected based on one or more selection criteria. Each bearer 128a-128n may correspond to a respective interface 125a-125n that is fixedly coupled to the vehicle 102. In an embodiment, the bearer selector engine 140 may determine the selected bearer. The one or more selection criteria may include, for example, one or more of a vehicle operating state, a user preference, a priority, a current condition, a characteristic of bearers included in the plurality of bearers, a characteristic of the information or data to be received or transmitted using the selected bearer, or a feature or service corresponding to the characteristic of the information or data. Each of these selection criteria will be described in detail in a later section of the present disclosure.

In addition to the selection criteria, the particular bearer may be selected based on a set of selection rules, an example of which is denoted by reference 142 in FIG. 3. The selection rules 142 may be stored on a tangible, non-transitory computer-readable storage medium (e.g., a memory, one or more memory devices, a data storage device, etc.) that is on-board the vehicle 102. The tangible, non-transitory computer-readable storage medium storing the selection rules 142 may be fixedly connected to the vehicle 102, in an embodiment. Additionally, the computer-readable storage medium storing the selection rules 142 may be the same computer-readable storage medium on which the bearer selector engine 140 is stored, or may be a different computer-readable storage medium. While FIG. 3 illustrates as the selection rules 142 as being stored externally to the on-board information distribution device 120, in other embodiments, the selection rules 142 are included in the on-board information distribution device 120. In any event, the content of the selection rules 142 may be obtained or provided to the bearer selector engine 140 of the on-board information distribution device 120, in an embodiment.

The selection rules 142 may provide an indication of the relative importance amongst various selection criteria for various combinations of conditions. For example, the selection criteria may provide an indication of a level of a particular selection criterion that is acceptable or unacceptable, e.g., bandwidth or signal strength. In another example, the selection rules 142 may indicate a range of values of a particular selection criterion that is acceptable or unacceptable. In yet another example, the selection criteria may indicate a particular bearer is to be used only when a certain combination of conditions are met, e.g., the vehicle is at least X miles away from its origination point or the vehicle is at an altitude of at least Y feet. The selection rules 142 may provide an indication of dependencies between various selection criteria, e.g., if selection criteria A has a value greater than X, then use selection criteria B to select the bearer, but if selection criteria A has a value less than or equal to X, then ignore selection criteria B when selecting the bearer. Generally, the selection rules 142 provide boundaries and guidelines for selecting the particular bearer from the plurality of different bearers 128a-128n, in an embodiment.

In an embodiment, the selection rules 142 may be represented by a set of weightings or priorities that are applied to or associated with each selection criterion and, in some cases, to each possible current condition. In an embodiment, the selection rules 142 may be represented by a set of logic statements, by a set of objects, by a database, and/or by any other suitable representation so that comparisons between various selection criterion, current conditions, and/or their values may be made.

In an embodiment, the selection rules 142 that are stored on-board the vehicle 102 are a master set of selection rules which may be backed up or copied to another storage device that is on-board or external to the vehicle 102. In another embodiment, the selection rules 142 on-board the vehicle 102 may be a local copy of a master set of selection rules that are stored externally to the vehicle 102. The local copy 142 may be transferred onto the vehicle 102 or updated at pre-determined times, and/or upon user request. For example, a master set of the selection rules may be stored in a ground based private network 105e that is accessed by the vehicle 102 when it docks or is parked at a terminal or port. Upon arrival of the vehicle 102 at the terminal or port, an updated copy of the master rules may be uploaded, copied or transferred from the network 105e to the vehicle 102 using the on-board information distribution device 120, such as via the Wi-Fi interface 125a, a direct connection 138, or some other suitable mechanism. In an embodiment, the selection rules 142 may be transferred using the messaging protocol described in aforementioned U.S. patent application Ser. No. 13/675,194, entitled "PUBLISHER AND SUBSCRIBER MESSAGING SYSTEM AND METHOD." Additionally, descriptions of example methods and systems of transferring the selection rules 142 and other data between a ground system and a vehicle may be found, for example, in aforementioned U.S. patent application Ser. No. 13/675,190 entitled "GROUND SYSTEM FOR VEHICLE DATA DISTRIBUTION".

Turning now to descriptions of the various criteria for selecting a bearer, one example of a selection criterion may be a vehicle operating state. The vehicle operating state may indicate a state of a vehicle 102 during its journey from an origination point to a destination point. For example, a train may have operating states corresponding to "parked at the gate and connected to terminal power," "parked at the gate and disconnected from terminal power," "accelerating to cruising speed," "at cruising speed," "decelerating from cruising speed," "stopped along route," and the like. In another example, an aircraft may have operating states corresponding to flight state, e.g., "parked at the gate and engines powered off," "parked at the gate and engines powered on," "taxiing," "take-off," "ascending," "altitude above (or below) a given threshold," "flight altitude," "holding pattern," "descending," "landing," and the like. Vehicle operating states may indicate a relative or absolute distance of travel along a route, e.g., "X % of route completed" or "within Y miles of origination or destination." In an embodiment, vehicle operating state may correspond to a relative or absolute geographical location of the vehicle in two or three-dimensional space, e.g., a geographical latitude, longitude, and/or altitude, or as detected by a GPS (Global Positioning System) device on-board the vehicle 102. Generally, a vehicle operating state may correspond to a physical state of the vehicle 102 itself, to a state of progression of the vehicle 102 along a travel route, and/or to a location of a vehicle 102.

One or more of the selection rules 142 for selecting a data or information bearer 128a-128n may correspond to the vehicle operating state selection criterion. For example, a selection rule may indicate that the ATG bearer 125e may be selected for use only after an aircraft has exceeded an altitude of 10,000 feet. Another selection rule may indicate that only the Wi-Fi bearer 128a can be selected whenever a vehicle 102 is parked at a terminal, gate or port. Yet another selection rule may indicate that one of the satellite bearers 125c, 125d is to be used when a ship is more than N miles from land. Other selection rules based on vehicle operating state may be defined and included in the rules 142.

Another selection criterion on which the selection of a particular bearer may be based is a characteristic of a bearer. A characteristic of a bearer may correspond to a dynamic operating condition of a bearer, such as "available to be used," "out of service," or an amount of currently available bandwidth. A characteristic of a bearer may correspond to an essentially fixed attribute of the bearer, such as how securely or quickly data or information may be transferred over the bearer (as compared to other bearers), a maximum or average throughput of the bearer, an indication of a bearer's reliability (as compared to other bearers), an amount of power or energy required to operate the bearer, or a monetary cost of operating or using the bearer.

One or more selection rules 142 may correspond to the bearer characteristic selection criterion. For example, a selection rule may indicate that a lowest cost available bearer is always to be selected for use. Another selection rule may indicate that a bearer having a power consumption under a particular threshold is to be selected when the vehicle 102 is not connected to an external power source, e.g., is not parked or docked at a port, terminal or gate. Other selection rules based on one or more characteristics of bearers may be possible.

Typically, but not necessarily, a selection based on a bearer characteristic may also be based on other selection criteria, such as a user preference and/or a characteristic of the information or data that is to be transmitted or received. A user preference selection criterion may be indicated by one or more different types of users of the data distribution system 100. One type of a user may be a passenger on the vehicle 102, such as a customer paying for travel over a route on a commercial airline, ship or train, or an executive traveling on a company jet. Such users are referred to herein as "end-users." Another type of user may be an operator or crew member who is on-board the vehicle during its journey, such as a pilot, an engineer, a flight attendant, a crew member responsible for some aspect of vehicle operation or maintenance, a captain, and the like. Such users are referred to herein as "crew members." Yet another type of user may be an agent of an organization or entity that owns or leases the particular vehicle 102 to provide travel, shipping, or transport services, such as an airline, a rail company, a package or cargo delivery company, and the like. Typically such an organization or entity has purchased or leased one or more instances of the data delivery system 100 for use in the vehicles that it owns or operates. Such agents of the organization or entity are referred to herein as "system users." A system user may be, for example, an administrator or Information Technology (IT) professional associated with the organization or entity. Lastly, a type of user may be an agent of the provider, producer or manufacturer of the data distribution system 100 itself. Such users are referred to herein as "system providers."

A system provider may provide a set of default selection rules 142 for a particular instance of the data distribution system 100. The default rules 142 may be customized for the particular instance of the data distribution system 100, and may be subsequently modified, in an embodiment. Preferences indicated by one or more different users may be incorporated into the default and/or modified selection rules 142. As such, one or more of the selection rules 142 may be generated or updated based on an indicated user preference. In an embodiment, a user may indicate his or her preferences via a user interface that is in direct connection 138 with the on-board data distribution device 120, or via a user interface of another computing device that is on-board the vehicle 102 and that provides access to the selection rules 142.

In another embodiment, a user may remotely indicate his or her preference. In one example scenario, a user may access a website hosted by a system provider to indicate the user's preference. The website may deliver the indicated user preference to a private network 105e corresponding to the data distribution system 100, and a master set of selection rules stored in the private network 105e may be updated based on the indicated user preference. A copy of the updated selection rules 142 (or relevant portion thereof that corresponds to the indicated user preference) may be uploaded or transferred to the vehicle 102 from the network 105e, e.g., while the vehicle 102 is docked or parked at a gate, port or terminal. In an embodiment, the updated selection rules 142 may be delivered onto the vehicle 102 using the bearer 128a or a direct connection 138 to the on-board data distribution device 120.

In an embodiment, a particular location within the network 105e at which the updated rules are to be to delivered to the vehicle 102 may be determined by the network 105e. For example, delivery of the updated rules to a particular location may be determined by a ground system for data distribution to vehicles, such as the ground system described in aforementioned U.S. patent application Ser. No. 13/675, 190 entitled "GROUND SYSTEM FOR VEHICLE DATA DISTRIBUTION".

In addition to user preference, a selection of a particular bearer may be based on a characteristic of the information or data that is to be transmitted or received. The characteristic of the information may correspond to a content, a priority, and/or an urgency of the data or information. For example, streaming data that includes movies or other in-flight entertainment may require a high bandwidth bearer, whereas end-user emails and web-surfing may be able to utilize lower bandwidth bearers. In an other example, software updates to various devices on-board the vehicle 102 that are non-time critical may utilize any available bandwidth of any bearer at any time. In yet another embodiment, critical alerts for navigating the vehicle 102 (such as those that correspond to the travel route and conditions associated therewith) may require the most reliable and the fastest bearer, and may be given priority over end-user data.

Various types of information or data may differ in their respective information characteristics, either innately or at different instances in time. Examples of information or data that may be delivered onto the vehicle 102 or transmitted from the vehicle 102 may include entertainment or news media, website content and interfaces, music, vehicle operator data (such as charts, maps and manuals), weather data, route condition data, traffic data, software updates to various devices on-board the vehicle 102, alerts, vehicle health information (whether snapshot or trend), logistical information for passengers and/or crew members, requests from passengers and/or crew members, operational data and monitoring reports of systems and services on-board the vehicle 102, and other information or data. One or more of the selection rules 142 may be based on respective characteristics of these types of data and information and their respective urgency for delivery. Examples of respective characteristics include, but are not limited to, requirements for bandwidth, time sensitivity, accuracy, and/or criticality of delivery; priority of the data relative to other types of data; complexity of the data; particular features or services corresponding to the data (or in which the data is utilized) and access permissions pertaining thereto; and other characteristics of the data or information.

As previously discussed, the bearer characteristics may be combined with other selection criteria such as user preference and/or information characteristics to influence the selection rules 142. In an embodiment, preferences of one or more users of one or more different types, in combination with information characteristics of different types of data to be delivered and bearer characteristics, may be reflected in the rules 142 for selecting a particular bearer. For example, selection of a particular bearer may be based on an indicated user preference for speed of data transfer, cost to transfer, and/or user requests, such as user requests to upload or offload certain types of data.

In an embodiment, a system user may indicate preferences that may be incorporated into the selection rules 142. The system user may indicate preferences to reflect business needs, e.g., costs of operation, desired end-user experience, vehicle maintenance requirements, and the like. For example, a system user may indicate that satellite bearers 128c, 128d are not to be selected except when critical vehicle operational data must be delivered. The system user may indicate that certain software updates for certain devices on-board the vehicle 102 are only to be transferred to the vehicle 102 over a Wi-Fi bearer 128a while the vehicle 102 is parked or docked at a gate, terminal or port, whereas other software updates may be transferred to the vehicle 102 using other designated bearers while the vehicle 102 is en route. The system user may indicate that any data generated by or to be delivered to end-users is required to be transferred via the Wi-Fi bearer 128a while the vehicle 102 is parked or docked at the gate, terminal or port, and is required to be transferred via the ATG bearer 128e while the vehicle is en route. The system user may indicate that vehicle operational data transfer always has priority over end-user data transfer. The system user may indicate a preferred order of bearer selection, e.g., first try the ATG bearer 125e, and if that is unavailable, then try the $K_u$ satellite bearer 125c. Other examples of system user preferences may be possible. Typically, the preferences indicated by a system user may not be overridden by an end-user, and the preferences indicated by a system user may or may not be overridden by a crew member. For example, a crew member may only be allowed to override a system user preference in case of an emergency.

In an embodiment, a system provider may indicate preferences that may be incorporated into the selection rules 142. In an embodiment, a system provider may indicate a preference to make certain bearers unavailable to certain system users or customers. For example, if a particular organization or entity has not paid for satellite communications services, a system provider may indicate a preference to have satellite bearers 128c, 128d be rendered unavailable for vehicles that are operated by the particular organization or entity. A system bearer may make certain bearers unavailable in certain countries, e.g., when a certain country's frequency spectrum allocation does not support a particular bearer. A system provider may indicate preferences that comport with governmental regulations and laws. A system provider may turn on a feature that utilizes a particular bearer for beta-testing in a set of vehicles. A system provider may indicate an order of hand-off between bearers and activation/de-activation of various bearers during emergency situations. Other examples of system provider preferences are possible. Generally, the preferences indicated by a system provider may not be overridden by system users, crew members, or end users.

Further, crew members may indicate preferences that may be incorporated into the selection rules 142. Crew member preferences may be indicated while the crew members are physically on-board the vehicle 102, such as via a direct connection 138, or crew members may update the preferences remotely, such as via a website in preparation for an upcoming journey. Example scenarios of crew member preferences may include requesting entertainment media uploads over satellite bearers 128c, 128d (for efficiency) while a majority of passengers are sleeping, or requesting updated weather maps to be uploaded to re-route the path of travel around storms. Typically, the preferences indicated by a crew member may be secondary to system provider and system user preferences. That is, system provider preferences and system user preferences may take precedence over crew member preferences.

Still further, end-users may indicate preferences that may be incorporated into the selection rules 142. For example, an end-user may indicate a preference based on desired bandwidth or performance at his or her user device. In an embodiment, a system user may allow end-users to select between Wi-Fi 128a, ATG 128e and satellite 125c, 125d bearers, and may charge the end-users accordingly for usage of the respective bearers. In some cases, though, an end-user may also be a system user, such as an owner of a corporate jet. In these cases, the end-user may be able to indicate system user preferences via his or her end-user device, the on-board data distribution device 102, another on-board computing device in connection with the selection rules 142, or remotely, such as via a web-site. Additionally, the end-user/system user may be able to update preferences during travel. Generally, though, end-user preferences may be secondary to system provider and system user preferences and to crew member preferences, in an embodiment.

Therefore, as discussed above, the selection rules 142 provide an indication of the relative importance amongst various selection criteria for various combinations of conditions, in an embodiment. As such, particular current values for one or more selection criteria of at least a subset of the plurality of bearers 125 may be obtained and compared, and based on the comparison and on the selection rules 142, a particular bearer may be selected.

Returning to block 202 of FIG. 4, in an embodiment, selecting a particular bearer may include selecting a portion of a particular bearer. For example, a particular bearer, such as the ATG bearer 128a, may be sub-divided into different portions, e.g., a higher bandwidth portion and a lower bandwidth portion, or a first portion that uses a first type of encoding and a second portion that uses a second type of encoding. A portion of a particular bearer may be selected based on a user preference, and/or based on the priority and other characteristics of the data or information to be delivered on-board the vehicle 102. In an embodiment, the bearer selector engine 140 may select the portion of the particular bearer.

At a block 205, at least part of the information or data that is to be received onto the vehicle 102 may be caused to be received onto the vehicle 102 using the selected bearer. The information or data may be caused to be received onto the vehicle 102 while the vehicle is parked or docked at a terminal, gate or port, and/or the information or data may be caused to be received onto the vehicle while the vehicle 102 is traveling en route between an origination point and a destination point. In an embodiment, the on-board information data distribution device 102 may cause the information or data to be received onto the vehicle using the selected bearer.

In an embodiment, the method 200 includes an optional block 208, in which a subsequent bearer may be determined. In an embodiment, the bearer selector engine 140 may determine the subsequent bearer, in a manner similar to selecting the initial bearer (as described with respect to the block 202). Thus, in embodiments including the block 208, a first portion of the information or data to be received onto the vehicle 102 may be caused to be received onto the vehicle 102 using the bearer selected at the block 202 (as previously described with respect to block 205), and a second portion of the information or data may be caused to be received onto the vehicle 102 using the subsequent bearer determined at the block 208 (as denoted by optional block 210). In an example, a subsequent bearer may be determined (block 208) when the bearer selected at the block 205 becomes unsuitable for use, e.g., equipment failure, the bearer becomes too noisy, the bearer's bandwidth decreases, etc. In this example, reception of the information or data may be handed off from the initially selected bearer to the subsequent bearer. Indeed, in some scenarios, multiple hand-offs may occur. In another example, a first portion of a software update or data upload may be received onto the vehicle 102 using a first selected bearer while a vehicle 102 has not yet departed its origination point, and a subsequent portion of the software update or data upload may be received onto the vehicle 102 via a subsequently determined bearer, such as while the vehicle 102 is en route or after the vehicle 102 has arrived at its final destination. Other scenarios in which at least one subsequent bearer is determined and used may be possible.

At a block 212, the received information or data may be routed to a destination device that is on-board the vehicle 102. The received information or data may be routed to the destination device via one of the on-board networks 135, or the received information or data may be routed to the destination device via one of the direct connections 138. In an embodiment, an information routing engine may cause the information or data to be routed to the destination device within the vehicle. The information routing engine may comprise computer-executable instructions that are stored on a tangible computer storage medium (which may or may not be the same tangible computer storage medium storing the bearer selection engine 140) and that are executable by a processor to cause the information or data to be routed to the appropriate on-board destination device. In an embodiment, the information routing engine is included in the on-board information data distribution device 120.

Figure 5:
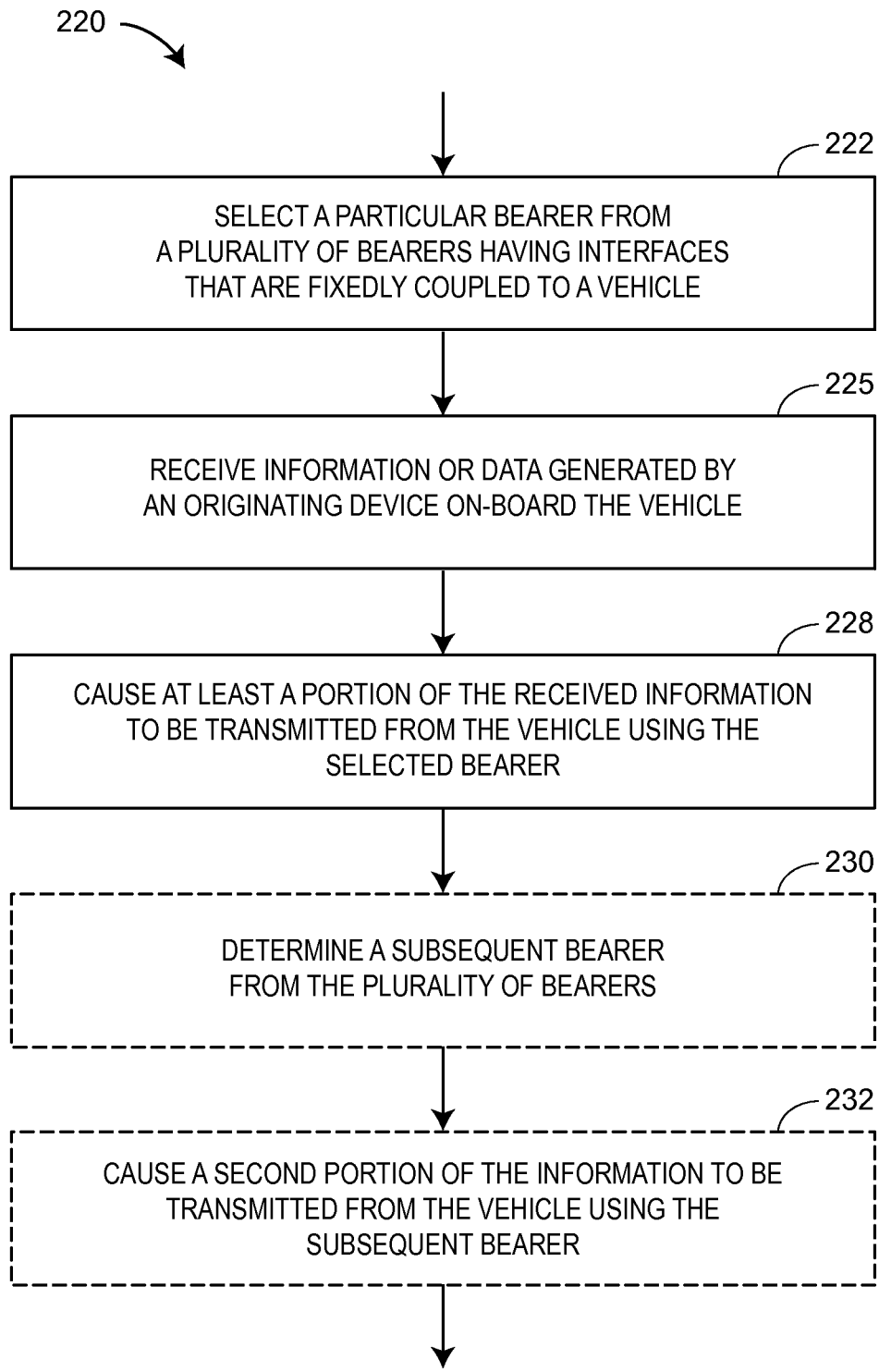
FIG. 5 is an example method for transmitting, from a vehicle, data that is generated on-board the vehicle.

FIG. 5 is an embodiment of a method 220 of distributing, from a vehicle, data that is generated on the vehicle. The method 220 may operate in conjunction with the data distribution system 100 of FIG. 1 and the on-board information distribution device 120 of FIG. 3, in an embodiment. For example, method 220 may be performed by the on-board information distribution device 120, for example. In other embodiments, the method 220 may operate in conjunction with other systems and devices. In some embodiments, at least a portion the method 220 is performed by the bearer selector engine 140. In some embodiments, the method 220 may be executed in conjunction with the method 200 of FIG. 4. For clarity, the method 220 is discussed below with reference to FIGS. 1, 2 and 3.

At a block 222, a particular bearer from the plurality of bearers 128a-128n may be selected based on one or more selection criteria. The plurality of bearers 128a-128n may be coupled to a plurality of interfaces 125a-125n that are fixedly connected to the vehicle 102, for example. In an embodiment, the bearer selector engine 140 may select the particular bearer based on one or more selection criteria. The one or more selection criteria may include, for example, one or more of a vehicle operating state, a user preference, a priority, a current condition, a characteristic of bearers included in the plurality of bearers, a characteristic of the information or data to be received or transmitted on the selected bearer, or a feature or service corresponding to the characteristic of the information or data, such as discussed previously with respect to the method 200 of FIG. 4. Furthermore, the particular bearer may be selected from the plurality of bearers 128a-128n based on one or more selection criteria and based on a set of selection rules 142, in a manner similar to that previously discussed with respect to the method 200 of FIG. 4. In contrast to the method 200, though, in the method 220, the particular bearer may be selected based on information that is to be transmitted from the vehicle 102 rather than based on information that is to be received onto the vehicle 102. For example, a crew member may indicate a preference that critical medical information is sent from the vehicle 102 via an ATG bearer 128e so that the critical medical information may be routed to the vehicle's destination to adequately prepare emergency medical personnel. In another example, a system user may indicate a preference for some flight record data to be downloaded from the vehicle 102 via a satellite bearer 125d for real-time updates during flight, and other flight record data to be downloaded via Wi-Fi bearer 128a after the vehicle has arrived at its final destination. Of course, other scenarios of selecting a particular bearer for transmission of data or information from a vehicle 102 are possible.

With further regard to block 222, in an embodiment, selecting a particular bearer may include selecting a portion of a particular bearer. For example, a particular bearer (e.g., an ATG bearer 128a) may be sub-divided into different portions, such as higher bandwidth portion and a lower bandwidth portion or a first portion using a first type of encoding and a second portion using a second type of encoding. A portion of a particular bearer may be selected based on a user preference, and/or based on the priority and other characteristics of the data or information to be transferred from the vehicle 102. In an embodiment, the bearer selector engine 140 may select the portion of the particular bearer.

At a block 225, information or data that was generated by an originating device on-board the vehicle 102 and that is for transmission from the vehicle 102 may be received. In an embodiment, the information or data to be transmitted from the vehicle 102 may be received at the on-board data distribution device 102. The information or data may be received from one of the on-board networks 135, or the information or data may be received from one of the direct connections 138. In an embodiment, the information or data may be routed by an information routing engine (such as the information routing engine described with respect to the method 200, or another information routing engine) to the on-board data distribution device 102 or to the on-board interfaces 135 therein for delivery from the vehicle 102.

At a block 228, at least a portion of the received information may be caused to be transmitted from the vehicle 102 using the selected bearer. The information or data may be caused to be transmitted from the vehicle 102 using the selected bearer while the vehicle is parked or docked at a terminal, gate or port, and/or the information or data may be caused to be transmitted from the vehicle using the selected bearer while the vehicle 102 is traveling en route between an origination point and a destination point. In an embodiment, the on-board information data distribution device 102 may cause the information of data to be transmitted from the vehicle using the selected bearer.

At an optional block 230 of the method 220, a subsequent bearer may be determined. In an embodiment, the bearer selector engine 140 may determine the subsequent bearer, in a manner similar to selecting the initial bearer (as described with respect to the block 222). In embodiments including the optional block 230, a first portion of the information or data to be transmitted from the vehicle 102 may be caused to be transmitted from the vehicle 102 using the bearer selected at the block 222 (as previously described with respect to block 228), and a second portion of the information or data may be caused to be transmitted from the vehicle 102 using the subsequent bearer determined at the block 230 (as denoted by optional block 232). In an example, a subsequent bearer may be determined (block 230) when the bearer selected at the block 222 becomes unsuitable for use, e.g., equipment failure, the bearer becomes too noisy, the bearer's bandwidth decreases, etc. In this example, transmission of the information or data may be handed off from the initially selected bearer to the subsequent bearer. Indeed, in some scenarios, multiple hand-offs may occur. In another example, a first portion of a data recorded during a vehicle's traversal of a route may be transmitted from the vehicle 102 using a first selected bearer while a vehicle 102 is en route, and a subsequent portion of the recorded data may be transmitted from the vehicle 102 via a subsequently determined bearer after the vehicle 102 has arrived at its final destination. Other scenarios in which at least one subsequent bearer is determined and used are possible.

The systems, methods and techniques described herein allow for many useful applications and benefits. One of the most significant of these applications and benefits is safety. Previously known vehicle data delivery systems typically operated independently of one another, so if a critical data delivery system experienced a failure while the vehicle was en route, the only possible fall-back approaches would be to have a redundant system (which is not only costly to purchase and maintain, but also adds extra weight and decreases space on-board the vehicle), or to rely on an operator of a vehicle to determine, in an emergency situation, how to compensate for the failure, which may result in less than optimal or even fatal decisions being made. With the techniques of the present disclosure, however, when a bearer fails, the selection rules 142 of the data delivery system 100 may automatically and seamlessly hand-off transfer of critical data from the failed bearer to an available bearer. Indeed, multiple hand-offs to ensure delivery of the data may occur.

With further regard to safety, the rules 142 may provide for critical updates to be transferred at a higher priority than other types of data. For example, if critical charts and maps relating to vehicle navigation are required to be delivered onto the vehicle while the vehicle is en route (e.g., due to an unexpected weather condition, terrorist act, or other such condition), the rules 142 may temporarily suspend other types of data communications while the critical charts and maps are being delivered.

Another advantage and application that is made possible by the techniques described herein may include up-to-the-minute navigation related data collection and transfer. For example, current weather and/or traffic conditions may be collected by various vehicles while they are each simultaneously en route, and the collected data may be aggregated to form a more accurate and detailed picture of navigation conditions in a particular area. For example, a fleet of vehicles operating in a particular area may utilize the techniques, systems and methods described herein to transfer real-time collected weather and traffic data to each other in an ad-hoc peer-to-peer fashion using the data delivery system 100. In some cases, the aggregation of the collected real-time data may be transferred to a stationary ground network.

Additionally, the systems, methods and techniques described here also allow for software updates (either content or functional) to be performed even while a vehicle is en route. For example, for long flights or ocean crossings, up-to-the-minute news updates may be delivered in a timely manner, or a suite of in-flight entertainment movies may be changed and updated during the journey or even streamed on-demand, if desired. Software updates for operation of various devices may also be updated while a vehicle is en route. For example, if a dangerous software virus is discovered that adversely affects navigation systems on-board a vehicle, a patch or vaccine may be immediately dispatched and applied while the vehicle is en route.

Furthermore, the systems, methods and techniques described herein allow for optimization of business operations for system users. Rather than having to purchase and maintain multiple, disparate data delivery systems, a system user may condense costs, weight and available vehicle space by using a single data delivery system 100 for multiple types of data transfer onto and off of a vehicle 102. Moreover, a system user may optimize operational costs to suit his or her business needs by customizing the selection rules 142 as desired. For example, a system user may allow an end-user, passenger, or customer aboard the vehicle to choose between speed, urgency or cost of data delivery, and may charge the customer differently for various end-user perceived data delivery performance and packages. System users that transport live cargo may be able to monitor the health and status of the cargo, and may be able to deliver real-time data corresponding to cargo status and health to ground systems while the vehicle is en route. A crew member may be able to inform a ground network, while the vehicle is en route, of supplies, parts and equipment that are needed to re-stock the vehicle 102 after it has arrived at its destination.

Still further, system users may have more flexibility in managing the usage of their fleet. For example, if a particular aircraft is to be used for a commercial flight, and then is to be used as a charter flight, the system user may simply schedule an update of any changes in data delivery parameters, priorities and conditions via a website, and such updates may be automatically configured in between the commercial and the charter flight. In another example, a crew member may be able to timely inform ground personnel, while the vehicle is en route, of supplies, parts, and equipment, and staff that are needed to re-stock and/or repair the vehicle 102 when it arrives at its destination.

Of course, the applications and benefits of the systems, methods and techniques described herein are not limited to only the above examples. Many other applications and benefits are possible by using the systems, methods and techniques described herein.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. A method of distributing data to a vehicle, comprising selecting, based on a selection criterion and by a computing device, a particular bearer from a plurality of bearers, the plurality of bearers being of different types and having interfaces for receiving information onto the vehicle, the interfaces being fixedly coupled to the vehicle and communicatively coupled to the computing device; causing information to be received onto the vehicle using the particular bearer; and routing, by the computing device, the received information to a destination device within the vehicle.

2. The method of any of the preceding aspects, wherein selecting the particular bearer comprises selecting a portion of the particular bearer and wherein causing the information to be received onto the vehicle using the particular bearer comprises causing the information to be received onto the vehicle using the selected portion of the particular bearer.

3. The method of any of the preceding aspects, wherein selecting the particular bearer comprises selecting the particular bearer based on a user preference.

4. The method of any of the preceding aspects, wherein selecting the particular bearer based on the selection criterion comprises selecting the particular bearer based on at least one selection criterion from a plurality of selection criteria, the plurality of selection criteria including at least one of: a vehicle operating state, a user preference, a priority, a characteristic of the plurality of bearers, a characteristic of the information, or a feature or service corresponding to the information.

5. The method of any of the preceding aspects, wherein selecting the particular bearer based on the at least one selection criterion comprises selecting the particular bearer based on a comparison of a plurality of values of the at least one selection criterion.

6. The method of any of the preceding aspects, wherein causing the information to be received onto the vehicle using the particular bearer comprises causing the information to be received onto the vehicle while the vehicle is en route between an origination point and a destination point.

7. The method of any of the preceding aspects, wherein causing the information to be received onto the vehicle comprises causing the information to be received, using a vehicle portal device, onto one of an airborne vehicle, a water-borne vehicle or a land-borne vehicle, the vehicle portal device fixedly connected to the vehicle and including the interfaces for receiving information onto the vehicle.

8. The method of any of the preceding aspects, wherein selecting the particular bearer from the plurality of bearers comprises selecting the particular bearer from a plurality of bearers including at least two different types of wireless bearers.

9. The method of any of the preceding aspects, wherein routing the received information to the destination device comprises routing the received information to the destination device using at least one of a plurality of networks that are on-board the vehicle.

10. The method of any of the preceding aspects, wherein the plurality of networks that are on-board the vehicle includes a wireless network.

11. The method of any of the preceding aspects, wherein the received information includes multiple portions, and the method further comprises: determining, based on the selection criterion, a subsequent bearer from the plurality of bearers; causing a first portion of the received information to be received onto the vehicle using the particular bearer; and causing a second portion of the received information to be received onto the vehicle using the subsequent bearer.

12. A method of distributing data generated on a vehicle, comprising selecting, based on a selection criterion and by a computing device, a particular bearer from a plurality of bearers, the plurality of bearers being of different types and coupled to interfaces for transmitting information from the vehicle, the interfaces being fixedly coupled to the vehicle and communicatively coupled to the computing device; receiving, by the computing device, information generated by an originating device within the vehicle; causing the received information to be transmitted from the vehicle using the particular bearer; and, optionally, the method of any of the preceding aspects.

13. The method of any of the preceding aspects, wherein selecting the particular bearer comprises selecting a portion of the particular bearer and wherein causing the received information to be transmitted from the vehicle using the particular bearer comprises causing the received information to be transmitted from the vehicle using the selected portion of the particular bearer.

14. The method of any of the preceding aspects, wherein selecting the particular bearer comprises selecting the particular bearer based on a user preference.

15. The method of any of the preceding aspects, wherein selecting the particular bearer based on the selection criterion comprises selecting the particular bearer based on at least one selection criterion from a plurality of selection criteria, the plurality of selection criteria including at least one of: a vehicle operating state, a user preference, a priority, a characteristic of the plurality of bearers, a characteristic of the information, or a feature or service corresponding to the information.

16. The method of any of the preceding aspects, wherein selecting the particular bearer based on the at least one selection criterion comprises selecting the particular bearer based on a comparison of a plurality of values of the at least one selection criterion.

17. The method of any of the preceding aspects, wherein causing the received information to be transmitted from the vehicle using the particular bearer comprises causing the received information to be transmitted from the vehicle while the vehicle is en route between an origination point and a destination point.

18. The method of any of the preceding aspects, wherein causing the information to be transmitted from the vehicle comprises causing the information to be transmitted, using a vehicle portal device, from an airborne vehicle, the vehicle portal device fixedly connected to the airborne vehicle and including the interfaces for transmitting information from the airborne vehicle.

19. The method of any of the preceding aspects, wherein selecting the particular bearer from the plurality of bearers comprises selecting the particular bearer from a plurality of bearers including at least two different types of wireless bearers.

20. The method of any of the preceding aspects, wherein receiving the information generated by the originating device comprises receiving the information generated by the originating device via one or more networks included within the vehicle to a vehicle portal device, the vehicle portal device including the interfaces for transmitting information from the vehicle.

21. The method of any of the preceding aspects, wherein the one or more networks includes a wireless network on-board the vehicle.

22. The method of any of the preceding aspects, wherein the received information is transmitted from the vehicle in multiple portions, and the method further comprises: determining, based on the selection criterion, a subsequent bearer; causing a first portion of the received information to be transmitted from the vehicle using the particular bearer; and causing a second portion of the received information to be transmitted from vehicle using the subsequent bearer.

23. A data distribution system on a vehicle, comprising a memory and computer-executable instructions stored on the memory and executable by a processor to select a particular bearer from a plurality of bearers. The computer-executable instructions are executable by the processor to further cause first data to be received into the vehicle, via a respective interface fixedly coupled to the vehicle and corresponding to the particular bearer, and cause the first data to be routed to a destination device within the vehicle; or cause second data to be transmitted from the vehicle via the respective interface corresponding to the particular bearer, the second data generated by an origination device on the vehicle. The respective interface may be one of a plurality of interfaces, each interface of the plurality of interfaces may correspond to a respective bearer or to a respective network on-board the vehicle, and each interface of the plurality of interfaces may be included in a vehicle portal device fixedly connected to the vehicle. The computer-executable instructions are executable by the processor to optionally execute the method of any of the preceding aspects.

24. The data distribution system of the previous aspect, wherein each bearer of the plurality of bearers is of a different type.

25. The data distribution system of any of the preceding aspects, wherein the computer-executable instructions to cause the first data to be received onto the vehicle via the respective interface corresponding to the particular bearer comprises computer-executable instructions to cause the first data to be received onto the vehicle via the respective interface corresponding to the particular bearer while the vehicle is en route from an origination point to a destination.

26. The data distribution system of any of the preceding aspects, wherein the vehicle is an aircraft.

27. The data distribution system of any of the preceding aspects, wherein the particular bearer is selected based on a comparison of different values of at least one selection criteria from a plurality of selection criteria, the plurality of selection criteria including at least one of: a vehicle parameter, a bearer parameter, an information parameter, a feature, a service, or a user preference parameter.

28. The data distribution system of any of the preceding aspects, wherein the different values of the at least one selection criteria correspond to at least one of different priorities or different bearers.

29. The data distribution system of any of the preceding aspects, wherein the bearer parameter includes respective indications, corresponding to each of more than one bearer, of at least one of: an availability, a cost, a bandwidth, a latency, or a priority.

30. The data distribution system of any of the preceding aspects, wherein the information parameter includes an indication, corresponding to the first data or to the second data, of at least one of: a state of a session or a call, a type of data, a priority of data, or an urgency of data.

31. The data distribution system of any of the preceding aspects, wherein at least one of the feature or the service is published or subscribed to by the vehicle portal device.

32. The data distribution system of any of the preceding aspects, wherein the vehicle parameter corresponds to an operating state of the vehicle.

33. The data distribution system of any of the preceding aspects, wherein the respective network on-board the vehicle is included in a set of networks that are hosted on-board the vehicle.

34. The data distribution system of any of the preceding aspects, wherein the set of networks hosted on-board the vehicle include a wireless network.

35. An information distribution system for distributing data to and from a vehicle, comprising an on-board information distribution device including a plurality of connections to a plurality of interfaces of a plurality of bearers to transmit first data from the vehicle and to receive second data onto the vehicle, the plurality of bearers being of different types and the plurality of interfaces being fixedly coupled to the vehicle; and a bearer selector engine included in the on-board information distribution device to select a particular bearer from the plurality of bearers. At least one of the on-board information distribution device or the bearer selector engine may be to perform the method of any of the preceding aspects. In an embodiment, the data distribution system of any of the preceding aspects is included in the information distribution system.

36. The information distribution system of the previous aspect, wherein each bearer of the plurality of bearers is of a different type.

37. The information distribution system of any of the preceding aspects, further comprising a ground computing device in communicative connection with the on-board information distribution device, wherein the ground computing device is not being transported by the vehicle.

38. The information distribution system of any of the preceding aspects, wherein the ground computing device is to deliver selection criteria to the on-board information distribution device for use by the bearer selector engine to select the particular bearer.

39. The information distribution system of any of the preceding aspects, wherein the bearer selector engine selects the particular bearer based on different values of at least one selection criteria from a plurality of selection criteria, the plurality of selection criteria including at least one of: a vehicle parameter, a bearer parameter, an information parameter, a feature, a service, a priority, or a user preference parameter.

40. The information distribution system of any of the preceding aspects, wherein at least one of: the vehicle parameter corresponds to an operational state of the vehicle; the bearer parameter includes respective indications, corresponding to each of more than one bearer, of at least one of: an availability, a cost, a bandwidth, a latency, or a priority; the information parameter includes an indication, corresponding to the first data or to the second data, of at least one of: a state of a session or a call, a type of data, or an urgency of data; or at least one of the feature or the service is published or subscribed to by the on-board information distribution device.

41. The information distribution system of any of the preceding aspects, wherein the different types of bearers are included in a set of bearer types including: a Wireless Local Area Network (WLAN) compatible bearer, a satellite communication or data bearer, an air-to-air communication or data bearer, an air-to-ground communication or data bearer, or another type of wireless communication or data bearer.

42. The information distribution system of any of the preceding aspects, wherein the on-board information distribution device further includes an information routing engine to at least one of: route, using at least one on-board communication network of a plurality of on-board communication networks, data received via an interface corresponding to the particular bearer to a destination device on-board the vehicle, or route, using the at least one on-board communication network, data generated by an origination device on-board the vehicle to the interface corresponding to the particular bearer or to an interface corresponding to another particular bearer for transmission from the vehicle.

43. The information distribution system of any of the preceding aspects, wherein the at least one on-board communication network includes at least one of an Ethernet network, an ARINC 429 network, a wired network, or a wireless network.

44. The information distribution system of any of the preceding aspects, wherein the on-board information distribution device further includes a respective direct connection with at least one of: a four-wire connection to a cockpit of the vehicle, an RS232 connection, a USB connection, a connection to on-board discrete controls of the vehicle, an E1 connection, a T1 connection, an HDMI connection, a short-range wireless connection, a POTS connection, an FXS connection, an FXO connection, or a stereo connection; and wherein the origination device or the destination device is communicatively coupled to the on-board information distribution device via one of the respective connections.

45. The information distribution system of any of the preceding aspects, wherein the on-board information distribution device further includes an information routing engine to at least one of: route, using a particular direct connection, data received via an interface corresponding to the particular bearer to a destination device on-board the vehicle and corresponding to the particular direct connection, or route, using the particular direct connection or another direct connection, data generated by an origination device on-board the vehicle to the interface corresponding to the particular bearer or to an interface corresponding to another particular bearer for transmission of the data generated by the origination device from the vehicle.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method of distributing data to a vehicle that is in-flight, comprising:
    selecting, by a computing device fixedly connected to the vehicle that is in-flight, and based on a bearer selection preference indicated by a system user, a bearer selection preference indicated by an end-user, and a set of selection rules, a particular bearer from a plurality of bearers,
        the bearer selection preference indicated by the system user corresponding to a particular type of data included in information that is to be received onto the vehicle,
        the particular type of data from a set of data types including one or more types of end-user data and one or more types of vehicle data,
        the plurality of bearers being of different types and having interfaces for receiving information onto the vehicle,
        the interfaces being fixedly coupled to the vehicle and communicatively coupled to the computing device,
        the bearer selection preference indicated by the end-user corresponding to at least one of a speed, an urgency, or a cost of data delivery,
        the set of selection rules represented by a respective set of weightings applied to each selection criterion for a plurality of possible conditions associated with the vehicle, and the set of selection rules indicating, for a plurality of current conditions associated with the vehicle, a respective relative importance of each selection criterion amongst a plurality of selection criteria for the plurality of current conditions, wherein at least one current condition is a current physical state of the vehicle during a journey from an origination point to a destination point, and wherein the current physical state of the vehicle is detected by the vehicle, and
        the end-user being a passenger operating a destination device within the vehicle;
    causing the information including the particular type of data to be received onto the vehicle using the particular bearer while the vehicle is in-flight; and
    routing, by the computing device via one or more networks that are on-board the vehicle, the information that has been received onto the vehicle to the destination device within the vehicle.

2. The method of claim 1, wherein selecting the particular bearer comprises selecting a portion of the particular bearer and wherein causing the information to be received onto the vehicle using the particular bearer comprises causing the information to be received onto the vehicle using the selected portion of the particular bearer.

3. The method of claim 1, wherein:
    the particular type of data is a first selection criterion included in a set of selection criteria indicated by the system user;
    the set of selection criteria indicated by the system user further includes at least one other selection criterion indicated by the system user, the at least one other selection criterion including at least one of: another type of data from the set of data types, a vehicle operating state, a priority, a characteristic of the plurality of bearers, a characteristic of the information that is to be received onto the vehicle, or a feature or service corresponding to the information that is to be received onto the vehicle;

at least two selection criterion included in the set of selection criteria have respective relative importances indicated by the set of selection rules; and selecting the particular bearer is further based on the at least one other selection criterion of the set of selection criteria indicated by the system user and comprises:

comparing a plurality of values of the first selection criterion and each of the at least one other selection criterion of the set of selection criteria, the plurality of values of the first criterion and the each of the at least one other selection criterion of the set of selection criteria corresponding to more than one bearer;

comparing the respective relative importances of the first selection criterion and the each of the at least one other selection criterion; and selecting the particular bearer based on the comparisons.

4. The method of claim 1, wherein causing the information to be received onto the vehicle using the particular bearer while the vehicle is in-flight comprises causing the information to be received onto the vehicle that is in-flight using a vehicle portal device, the vehicle portal device fixedly connected to the vehicle and including the interfaces for receiving information onto the vehicle that is in-flight.

5. The method of claim 3, wherein the information that has been received onto the vehicle includes multiple portions, and the method further comprises:

determining, based on the set of selection criteria, a subsequent bearer from the plurality of bearers;

causing a first portion of the information to be received onto the vehicle using the particular bearer; and causing a second portion of the information to be received onto the vehicle using the subsequent bearer.

6. The method of claim 1, wherein:

the one or more types of end-user data include one or more of web pages, email, text messages, streaming data, in-flight entertainment, media, or another end-user feature or service; and the one or more types of vehicle data include one or more of vehicle operator data, weather data, traffic data, vehicle health information, flight data, other operational data, other condition data, or reports.

7. A method of distributing data generated on a vehicle that is in-flight, comprising:

selecting, by a computing device that is fixedly connected to the vehicle that is in-flight, and based on a bearer selection preference indicated by a system user, a bearer selection preference indicated by an end-user, and a set of selection rules, a particular bearer from a plurality of bearers, the bearer selection preference indicated by the system user corresponding to a particular type of data included in information that is to be transmitted from the vehicle, the particular type of data from a set of data types including one or more types of end-user data and one or more types of vehicle data, the plurality of bearers being of different types and coupled to interfaces for transmitting information from the vehicle, the interfaces being fixedly coupled to the vehicle and communicatively coupled to the computing device, the bearer selection preference indicated by the end-user corresponding to at least one of a speed, an urgency, or a cost of data delivery, the set of selection rules represented by a respective set of weightings applied to each selection criterion for a plurality of possible conditions associated with the vehicle, and the set of selection rules indicating, for a plurality of current conditions associated with the vehicle, a respective relative importance of each selection criterion amongst a plurality of selection criteria for the plurality of current conditions, wherein at least one current condition is a current physical state of the vehicle during a journey from an origination point to a destination point and wherein the current physical state of the vehicle is detected by the vehicle, and the end-user being a passenger operating a originating device within the vehicle;

receiving, by the computing device via one or more networks on-board the vehicle that is in-flight, information generated by the originating device within the vehicle, the information generated by the originating device including the particular type of data; and causing the received information to be transmitted from the vehicle using the particular bearer while the vehicle is in-flight.

8. The method of claim 7, wherein selecting the particular bearer comprises selecting a portion of the particular bearer and wherein causing the received information to be transmitted from the vehicle using the particular bearer comprises causing the received information to be transmitted from the vehicle using the selected portion of the particular bearer.

9. The method of claim 7, wherein:

the particular type of data is a first selection criterion included in a set of selection criteria indicated by the system user;

the set of selection criteria indicated by the system user further includes at least one other selection criterion indicated by the system user, the at least one other selection criterion including at least one of: another type of data from the set of data types, a vehicle operating state, a priority, a characteristic of the plurality of bearers, a characteristic of the information that is to be transmitted from the vehicle, or a feature or service corresponding to the information that is to be transmitted from the vehicle; and selecting the particular bearer is further based on the at least one other selection criterion of the set of selection criteria indicated by the system user and comprises:

comparing a plurality of values of the first criterion and the each of the at least one other selection criterion included in the set of selection criteria, the plurality of values of the first criterion and the each of the at least one other selection criteria corresponding to more than one bearer; and selecting the particular bearer based on the comparison.

10. The method of claim 7, wherein causing the received information to be transmitted from the vehicle using the particular bearer while the vehicle is in-flight comprises causing the information to be transmitted from the vehicle that is in-flight using a vehicle portal device, the vehicle portal device fixedly connected to the vehicle and including the interfaces for transmitting information from the vehicle that is in-flight.

11. The method of claim 7, wherein the plurality of bearers includes at least two different types of wireless bearers.

12. The method of claim 9, wherein the received information is transmitted from the vehicle in multiple portions, and the method further comprises:
    determining, based on the set of selection criteria, a subsequent bearer;
    causing a first portion of the received information to be transmitted from the vehicle using the particular bearer; and
    causing a second portion of the received information to be transmitted from vehicle using the subsequent bearer.

13. The method of claim 7, wherein:
    at least two selection criterion included in the plurality of selection criteria have respective relative importances indicated by the set of selection rules; and
    selecting the particular bearer is further based on a comparison of the respective relative importances.

14. The method of claim 7, wherein:
    the one or more types of end-user data include one or more of web pages, email, text messages, streaming data, in-flight entertainment, media, or another end-user feature or service; and
    the one or more types of vehicle data include one or more of vehicle operator data, weather data, traffic data, vehicle health information, flight data, other operational data, other condition data, or reports.

15. A data distribution system on a vehicle, comprising:
    a memory that is fixedly disposed at the vehicle; and
    computer-executable instructions stored on the memory and executable by a processor to, while the vehicle is in-flight:
        select a particular bearer from a plurality of bearers, the selection based on a bearer selection preference indicated by a system user, a bearer selection preference indicated by an end-user, and a set of selection rules,
            the bearer selection preference indicated by the system user corresponding to a particular data type that is to be at least one of received onto or transmitted from the vehicle,
            the particular data type from a set of data types including one or more types of end-user data and one or more types of vehicle data,
            the bearer selection preference indicated by the end-user corresponding to at least one of a speed, an urgency, or a cost of data delivery,
            the set of selection rules represented by a respective set of weightings applied to each selection criterion for a plurality of possible conditions associated with the vehicle, and the set of selection rules indicating, for a plurality of current conditions associated with the vehicle, a respective relative importance of each selection criterion amongst a plurality of selection criteria for the plurality of current conditions, wherein at least one current condition is a current physical state of the vehicle during a journey of the vehicle between an origination point and a destination point, and wherein the current physical state of the vehicle is detected by the vehicle, and
            the end-user being a passenger operating at least one of: a destination device within the vehicle or an origination device within the vehicle, and
        at least one of:
            cause first data to be received onto the vehicle that is in-flight, via a respective interface fixedly coupled to the vehicle and corresponding to the particular bearer, and cause the first data to be routed to the destination device within the vehicle; or
            cause second data to be transmitted from the vehicle that is in-flight via the respective interface corresponding to the particular bearer, the second data generated by the origination device on the vehicle,
        wherein:
            at least one of the first data or the second data is of the particular data type corresponding to the bearer selection preference indicated by the system user,
            the respective interface is one of a plurality of interfaces,
            each interface of the plurality of interfaces corresponds to a respective bearer or to a respective network on-board the vehicle, and
            each interface of the plurality of interfaces is included in a vehicle portal device fixedly connected to the vehicle.

16. The data distribution system of claim 15, wherein the plurality of bearers includes an air-to-ground communications network and at least one of a satellite communications network or a ground based mobile communications network.

17. The data distribution system of claim 15, wherein:
    the particular data type corresponding to the bearer selection preference indicated by the system user is a first selection criterion of a set of selection criteria indicated by the system user;
    the set of selection criteria indicated by the system user further includes at least one other selection criterion indicated by the system user, the at least one other selection criterion including at least one of: another data type from the set of data types, a vehicle parameter, a bearer parameter, an information parameter, a feature, a service, or a priority; and
    the particular bearer is selected further based on a comparison of different values of the at least one other selection criterion from the set of selection criteria.

18. The data distribution system of claim 17, wherein the different values of the each member of the set of selection criteria correspond to at least one of different priorities or different bearers.

19. The data distribution system of claim 17, wherein the bearer parameter includes respective indications, corresponding to each of at least two different bearers, of at least one of: an availability, a cost, a bandwidth, a latency, or a priority.

20. The data distribution system of claim 17, wherein the information parameter includes an indication, corresponding to the first data or to the second data, of at least one of: a state of a session or a call, a priority of data, or an urgency of data.

21. The data distribution system of claim 17, wherein at least one of the feature or the service is published or subscribed to by the vehicle portal device.

22. The data distribution system of claim 17, wherein the vehicle parameter corresponds to an operating state of the vehicle.

23. The data distribution system of claim 15, wherein:
    the one or more types of end-user data include one or more of webpages, email, text messages, streaming data, in-flight entertainment, media, or another end-user feature or service; a
    the one or more types of vehicle data include one or more of vehicle operator data, weather data, traffic data, vehicle health information, flight data, other operational data, other condition data, or reports.

24. The data distribution system of claim 17, wherein the particular bearer is selected further based on respective relative importances, as indicated by the set of selection rules, of the at least one other selection criterion.

25. An information distribution system for distributing data to and from a vehicle that is in flight, comprising:
an on-board information distribution device that is fixedly connected to the vehicle that is in-flight, the on-board information distribution device including a plurality of connections to a plurality of interfaces of a plurality of bearers to transmit first data from the in-flight vehicle and to receive second data onto the in-flight vehicle, the plurality of bearers being of different types and the plurality of interfaces being fixedly coupled to the in-flight vehicle;
a bearer selector engine included in the on-board information distribution device to select a particular bearer from the plurality of bearers based on a bearer selection preference indicated by a system user, a bearer selection preference indicated by an end-user, and a set of selection rules,
the end-user being a person within the in-flight vehicle,
the bearer selection preference indicated by the system user corresponding to a particular type of data that is to be at least one of received onto or transmitted from the in-flight vehicle,
the particular type of data from a set of data types including one or more types of end-user data and one or more types of vehicle data,
the bearer selection preference indicated by the end-user corresponding to at least one of a speed, an urgency, or a cost of data delivery, and
the set of selection rules represented by a respective set of weightings applied to each selection criterion for a plurality of possible conditions associated with the vehicle, and the set of selection rules indicating, for a plurality of current conditions associated with the vehicle, a respective relative importance of each selection criterion amongst a plurality of selection criteria for the plurality of current conditions, wherein at least one current condition is a current physical state of the vehicle during a journey from an origination point to a destination point, and wherein the current physical state of the vehicle is detected by the vehicle; and
a processor configured to receive detection data from a detection device on-board the vehicle and at least one of:
cause the first data to be received onto the vehicle that is in-flight, via a respective interface of the plurality of interfaces and cause the first data to be routed to a destination device of the end-user within the vehicle, wherein the destination device is separate from the detection device, or
cause the second data to be transmitted from the vehicle that is in-flight via the respective of the plurality of interfaces, the second data generated by an origination device of the end user on the vehicle, wherein the detection device is separate from the origination device.

26. The information distribution system of claim 25, further comprising a ground computing device in communicative connection with the on-board information distribution device, wherein the ground computing device is not transported by the in-flight vehicle.

27. The information distribution system of claim 26, wherein the ground computing device is to deliver a set of selection criteria to the on-board information distribution device for use by the bearer selector engine to select the particular bearer, the set of selection criteria including the bearer selection preference indicated by the system user and the bearer selection preference indicated by the end-user.

28. The information distribution system of claim 25, wherein:
a first selection criterion included in a set of selection criteria includes the particular type of data corresponding to the bearer selection preference indicated by the system user;
at least one selection criterion included in the set of selection criteria and indicated by the system user includes at least one of: another type of data from the set of data types, a vehicle parameter, a bearer parameter, an information parameter, a feature, a service, a priority, or a user preference parameter; and
the bearer selector engine selects the particular bearer further based on at least one of:
different values of the at least one other selection criterion from the set of selection criteria, or
respective relative importances, as indicated by the set of selection rules, of the at the least one other selection criterion from the set of selection criteria.

29. The information distribution system of claim 28, wherein at least one of:
the vehicle parameter corresponds to an operational state of the in-flight vehicle;
the bearer parameter includes respective indications, corresponding to each of more than one bearer, of at least one of: an availability, a cost, a bandwidth, a latency, or a priority;
the information parameter includes an indication, corresponding to the first data or to the second data, of at least one of: a state of a session or a call, or an urgency of data; or
at least one of the feature or the service is published or subscribed to by the on-board information distribution device.

30. The information distribution system of claim 25, wherein the different types of bearers are included in a set of bearer types including: a Wireless Local Area Network (WLAN) compatible bearer, a satellite communication or data bearer, an air-to-air communication or data bearer, an air-to-ground communication or data bearer, or another type of wireless communication or data bearer.

31. The information distribution system of claim 25, wherein the on-board information distribution device further includes an information routing engine to at least one of:
route, using at least one on-board communication network of a plurality of on-board communication networks, data received via an interface corresponding to the particular bearer to a destination device on-board the in-flight vehicle, or
route, using the at least one on-board communication network, data generated by an origination device on-board the in-flight vehicle to the interface corresponding to the particular bearer or to an interface corresponding to another particular bearer for transmission from the in-flight vehicle; and
wherein the at least one on-board communication network includes at least one of an Ethernet network, an ARINC 429 network, a wired network, or a wireless network.

32. The information distribution system of claim 25,
wherein the on-board information distribution device further includes a respective direct connection with at least one of: a four-wire connection to a cockpit of the in-flight vehicle, an RS232 connection, a USB (Universal Serial Bus) connection, a connection to on-board discrete controls of the in-flight vehicle, an E1 connection, a T1 connection, an HDMI (High Definition Multimedia Interface) connection, a short-range wireless connection, a POTS (Plain Old Telephone Service) connection, an FXS (Foreign eXchange Subscriber) connection, an FXO (Foreign eXchange Office) connection, or a stereo connection; and
wherein the origination device or the destination device is communicatively coupled to the on-board information distribution device via one of the respective connections.

33. The information distribution system of claim 28, wherein an updated set of selection criteria is transferrable to the vehicle using at least one of the plurality of bearers while the vehicle is at least one of stationary or in motion.

34. The information distribution system of claim 25, wherein:
the one or more types of end-user data include one or more of webpages, email, text messages, streaming data, in-flight entertainment, media, or another end-user feature or service; and
the one or more types of vehicle data include one or more of vehicle operator data, weather data, traffic data, vehicle health information, flight data, other operational data, other condition data, or reports.

35. The information distribution system of claim 25, wherein the passenger operating at least one of the destination device within the in-flight vehicle or the origination device within the in-flight vehicle is a crew member.

* * * * *